3,563,032
HYDROSTATIC PRESSURE PRIME MOVER
Ralph E. La Pointe, Box 1737, Anchorage, Alaska
Continuation-in-part of application Ser. No. 719,498, Apr. 8, 1968. This application Mar. 27, 1970, Ser. No. 23,411
Int. Cl. F01b 21/02
U.S. Cl. 60—49       10 Claims

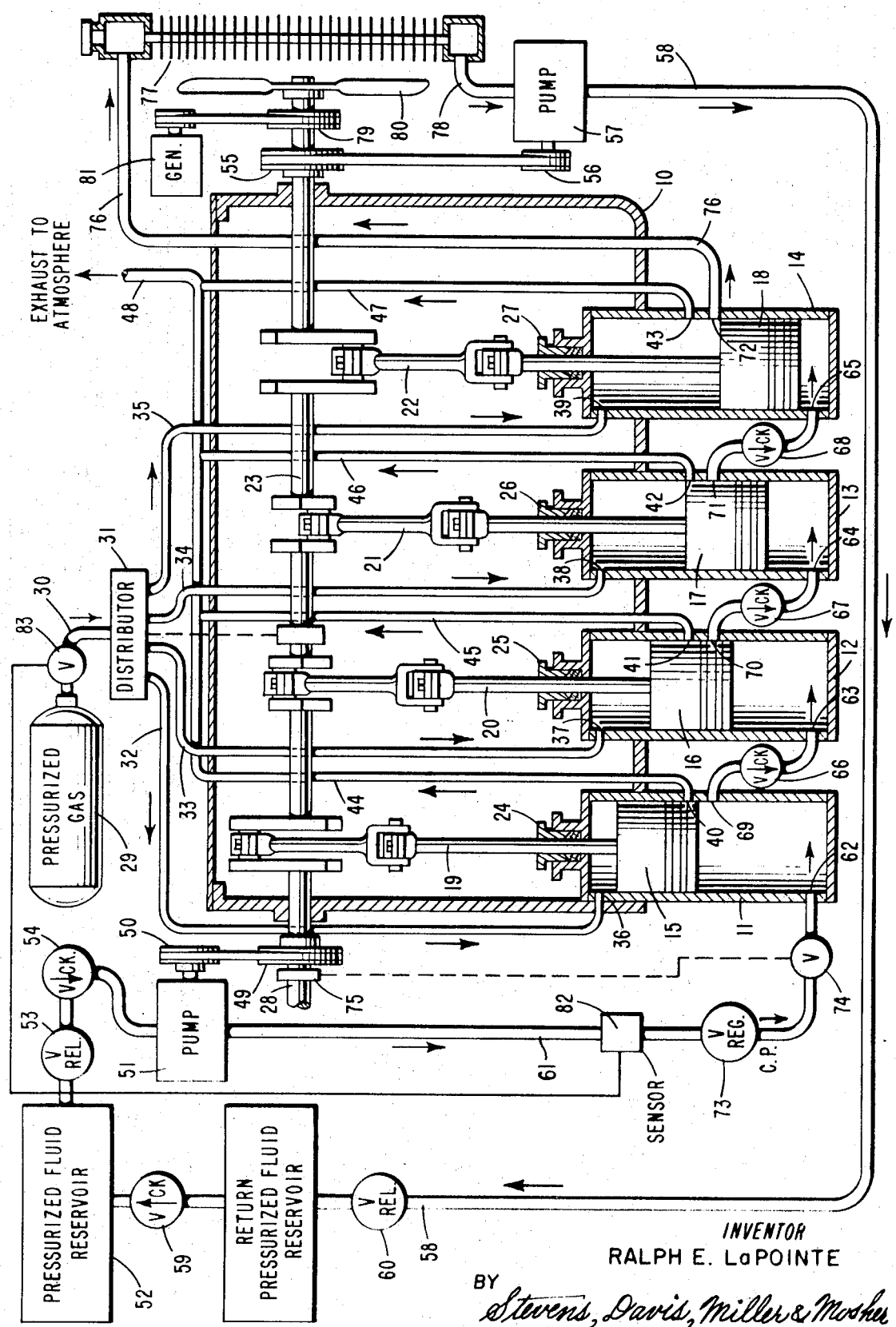

ABSTRACT OF THE DISCLOSURE

A hydrostatic pressure operated prime mover having a block in which a conventional crankshaft is turned in response to the reciprocating displacement of a plurality of pistons in a like plurality of cylinder chambers, the pistons being subjected to the sequential action of two separate pressurizing fluids acting on opposite end faces of the pistons. One pressurized fluid is delivered sequentially to the cylinders from a first pressurized source and the resulting crankshaft rotation operates pump means to circulate the second pressurizing fluid. Since there is no combustion involved in operating this prime mover, pollution of the atmosphere is avoided.

---

The present application is a continuation-in-part of my application Ser. No. 719,498, filed Apr. 8, 1968, and now abandoned.

BACKGROUND OF THE INVENTION

A great need exists for a prime mover which can be used to operate automotive vehicles and the like at the required speeds without the combustion of fuel and the resulting pollution of the atmosphere. Various attempts have been made in the prior art to achieve this aim but without the desired amount of success. The object of the present invention is to provide a hydrostatic pressure operated power plant or prime mover which is entirely free from the combustion of fuels and therefore completely eliminates the atmospheric pollution which is inherently present in conventional internal combustion engines, while at the same time furnishing a practical device.

SUMMARY OF THE INVENTION

In the inventive prime mover, a first pressurized working fluid is delivered from a first pressure source through a distribution device to the respective ends of the pistons in the cylinder chambers to cause initial crankshaft rotation. The resulting initial piston displacement will vent the first working fluid to the atmosphere and the distribution device will cut off delivery of such fluid. The initial displacement and crankshaft rotation will also drive pressurizing pump means for a second working fluid, also under pressure, and which is now delivered to the opposite ends or working faces of the pistons to displace them in the opposite direction for causing further crankshaft rotation and the sequential delivery of further charges of the first working fluid to the cylinder chambers.

BRIEF DESCRIPTION OF THE DRAWINGS

The means for accomplishing the foregoing objects and other advantages, which will be apparent to those skilled in the art, are set forth in the following specification and claims and are illustrated in the accompanying drawing dealing with a basic embodiment of the present invention. Reference is made now to the drawing in which:

The single figure represents a diagrammatic cross sectional view through a prime mover embodying the invention.

DESCRIPTION OF THE PREFERRED EMBODIMENT

Referring now to the drawing, the cylinder block 10 has therein a plurality of cylinder chambers 11, 12, 13 and 14 within which are slidably mounted pistons 15, 16, 17 and 18, respectively. Of course, any number of cylinders may be used as necessary. Only four have been shown for the sake of clarity of the drawings. The pistons are each connected by conventional connecting rod means 19, 20, 21 and 22 with a conventional crankshaft 23 having individual crank sections for each piston as shown. The connecting rods also pass through sealing means 24, 25, 26 and 27 at the upper end of each of the cylinder chambers. The crankshaft 23 is suitably journalled in the block for rotation and includes a power takeoff extension 28 outside of the cylinder block 10 and leading to the transmission.

A first pressurized working fluid, preferably nitrogen gas under high pressure, is contained in the remote, rechargeable pressurized source tank 29 (for example, a cylinder with a 220 cubic feet, 2000 p.s.i. capacity) having a feed line 30 leading to a rotary distribution device 31 having outlets adapted to register at certain times with feed lines 32, 33, 34 and 35 which in turn are connected to corresponding inlet ports 36 to 39 at the upper ends of cylinders 11, 12, 13 and 14, respectively. The lines 32 to 35 are secured to the block 10 and the rotary distribution device 31 controls the emission of high pressure nitrogen to the cylinders 11 to 14 in the proper order and timing.

The rotary distribution device 31 is similar to the distributor of an internal combustion engine but feeds fluids rather than electricity. The device is driven from the crankshaft by conventional means, here noted by a dashed line.

The cylinders 11 to 14 have exhaust ports 40 to 43, respectively, located close to the center position of the cylinders but on that side of the center towards the end having inlet ports 36 to 39 with the feed lines 32 to 35 connected therein. These ports connect with the exhaust lines 44 to 48 and vent to the atmosphere outside the block 10 as indicated at 48. When the pistons 15 to 18 are in their uppermost position in the drawing, the exhaust ports 40 to 43 will be closed off by the respective pistons so that the pressurized gas entering the upper portion of the cylinder chamber will drive the pistons downwardly, in the proper order, to cause the initial crankshaft rotation and piston displacement. As each piston is thus displaced, the exhaust ports 40 to 43 will be sequentially uncovered by the pistons and the high pressure working gas above the pistons will be exhausted to atmosphere. Rotation of the distribution device 31 times the admission of high pressure nitrogen to the top of the next succeeding cylinder until all of the pistons have been sequentially forced downwardly a predetermined amount and have been vented to atmosphere, in proper order, as described.

This initial portion of the working cycle, caused by the first pressurized fluid from the tank 29, causes rotation of the crankshaft 23 to drive the distribution device 31 by conventional means, as mentioned above. It also causes rotation of a first pulley 49 to drive a second pulley 50 on a first hydrostatic pressurizing pump 51 for a second working fluid, such as lightweight oil (preferably No. 5 oil), which is stored in a remote, inter-rechargeable pressurized feed reservoir 52 (for example, a cylinder with a 220 cubic feet, 2000 p.s.i. capacity). Suitable excess pressure relief and check valves 53 and 54, respectively, are arranged between the pump 51 and the reservoir 52. The initial crankshaft rotation also turns third pulley 55 near its other end driving still a fourth pulley 56 connected with and driving a second hydrostatic pump 47, feeding a return line 58 leading back to the reservoir 52. There is a one way check valve 59 between the reservoir 52 and the pump 57 and an excess pressure relief valve 60 in the return line 58.

The first pump 51 is capable of delivering the second working fluid under the required pressure through the line or pipe 61 into inlet ports 62 to 65 at the opposite or bottom end portions of the cylinders 11 to 14 in series as shown. One way check valves 66 to 68 are interposed between exhaust ports 69 to 71 of adjacent cylinders to prevent equalization of the pressures which would render the system inoperative if this occurred. Exhaust port 72 will be discussed later. A suitable pressure regulator 73 is provided in the line 61 in advance of the cylinders as well as a quick opening valve 74 operated by a device 75 on the crankshaft which responds to four positions of the pistons during rotation of the crankshaft. By this means, the second working fluid is delivered at the proper time sequence to the bottom portion of each cylinder 11 to 14. After the first working fluid above the respective pistons has been exhausted, the second working fluid, such as oil, drives the pistons upwardly and imparts further rotation to the crankshaft 23 during the second portion of the working cycle of each cylinder. Upon leaving exhaust port 72 in the last cylinder 14, the second working fluid flows through a return line 76 to cooling radiator 77 and line 78 to the second or return pump 53.

Another pulley means 79 on the crankshaft drives the cooling fan 80 and other accessories, such as the generator 81, to power electrical components of the vehicle. In the above manner, a continuous and properly timed operating cycle takes place repeatedly under the influence of the two separate and coordinated working fluid systems.

The hydrostatic pumps 51 and 57 can produce, e.g., 1500 p.s.i. per minute, and can be said to disengage at, e.g., 2000 p.s.i. and re-engage at e.g., 1000 p.s.i. The pressure regulator valves are of a high-low cutout type and are used to determine pressure tolerances. In the event of malfunctioning, the pressure relief valves set at, for example, 2500 p.s.i., will protect the system. The pressure regulator valve 73 on the incoming hydrostatic line (calibrated at e.g., 850 p.s.i.) will provide enough force to drive the pistons upward from the bottom of the cylinders. The nitrogen pressure will cut off when hydrostatic pressure is supplying the necessary energy to drive the pistons and cut in when additional energy is needed. This is accomplished by means of the pressure sensor 82 located in pipe 61 and valve 83 which is operatively connected to be responsive to the sensor.

It may be helpful to here summarize the flow paths of the two fluids. The first working fluid passes from tank 29 and valve 83 via pipe 30 to the distribution means 31 where it is sequentially directed to feed lines 32 to 35. Since the flow of the first fluid is the same for each cylinder, only cylinder 11 will be described. The pressurized fluid enters port 36 and acts against the upper face of piston 15 to drive it downward until exhaust port 40 is uncovered. At this time the pressurized first fluid will be exhausted to atmosphere through exhaust line 44 and port 48. The distribution device 31 has cut off flow of the first fluid to cylinder 11 by the time exhaust port 40 is opened.

The second fluid flows from reservoir 52 through valves 53 and 54 to pump 51. From there it passes through pipe 61, pressure sensor 82 and valves 73 and 74 to the cylinders. The second fluid begins a somewhat tortuous path through inlet 62, exhaust port 69, check valve 66, inlet 63, exhaust port 70, check valve 67, inlet 64, exhaust port 71, check valve 68, inlet 65, and exhaust port 72 before starting its return journey through return line 76, radiator 77, line 78, pump 57, return line 58 and valves 60 and 59 to reservoir 52.

The rotary distribution device 31, in effect, is the timing means of the first fluid or nitrogen system which acts on one side of the pistons whereas the valve means 74 is the timing means for the second working fluid controlling the admission of the same to the cylinders on the opposite side of each piston from the first fluid.

In view of the foregoing description, the operation of the inventive prime mover should now be clear. The present invention may be embodied in other specific forms without departing from the spirit or essential characteristics thereof. It is to be understood that the form of the invention herewith shown and described is to be considered in all respects as illustrative and not restrictive, the scope of the invention being indicated by the appended claims rather than the foregoing description. The various changes in shape, size and arrangement of the parts which may come within the meaning and range of equivalency of the claims are therefore to be embraced therein.

What is claimed is:

1. A prime mover comprising a crankshaft including a power take-off extension, a plurality of pistons drivingly connected to the crankshaft and having opposing first and second working faces, a like plurality of cylinders receiving the pistons therein and each having first inlet and first exhaust opening means, said first inlet means being located adjacent one end of said cylinders, said first exhaust opening means being located near the center of said cylinders, a source of first working fluid, means for delivering said first working fluid under pressure and in timed sequence to said first inlet opening means to act upon said first working faces to thereby drive the pistons in one direction in proper sequence, each said cylinder also having second inlet and second exhaust opening means, said second inlet means being at the opposite ends of said cylinders, said second exhaust means being near the center of said cylinders, a source of second working fluid, means to feed said second working fluid sequentially to said second inlet means to act upon said second working faces to drive the pistons in the opposite direction, pressurizing and circulating pump means for the second working fluid, and means drivingly connecting the crankshaft and said pressurizing and circulating pump means.

2. A prime mover as defined in claim 1, wherein the pressurizing and circulating pump means comprises a pair of pumps, one upstream of the cylinders and one downstream thereof, cooling means for the second working fluid between the cylinders and the pump downstream of the cylinders.

3. A prime mover as defined in claim 1 further comprising check valve means in the delivery means for the second working fluid between the second exhaust means and second inlet means of each pair of cylinders to prevent equalization of the pressure of the second working fluid in adjacent cylinders.

4. A prime mover as defined in claim 1, wherein the pressurizing and circulating pump means further comprises a feed line leading from one pump to the second inlet means of a first cylinder of the prime mover and then in series to all of the other cylinders and then to a second pump which returns the second working fluid to its source.

5. A prime mover as defined in claim 2, wherein the means drivingly connecting the drive shaft and said pressurizing and circulating pump means comprises a pair of transmission means drivingly interconnecting the crankshaft and a pair of pumps whereby the latter are operated in unison.

6. A prime mover as defined in claim 5 wherein each transmission means comprises a pulley on the crankshaft, another pulley on an input shaft of one of said pumps, and means drivingly interconnecting said pulleys.

7. A prime mover as defined in claim 1, wherein the means for delivering said first working fluid comprises a rotary distributor device for controlling the feeding of the first working fluid to the cylinders in proper order and timing, and transmission means drivingly interconnecting the crankshaft and distributor device.

8. A prime mover as defined in claim 7, further comprising a main feed line for the first working fluid connecting said source to the distributor device and branch feed lines connecting each of the cylinders to the distributor device and exhaust lines connecting each cylinder to atmosphere.

9. A prime mover as defined in claim 1, wherein the means for delivering said first working fluid comprises a high pressure source of said first working fluid remote from the cylinders.

10. A prime mover as defined in claim 1, wherein the pressurizing and circulating pump means for the second working fluid comprises a pair of pumps one upstream from the cylinders and one downstream therefrom, feed line means running from the upstream pump sequentially through the cylinders to the downstream pump, reservoir means for the second working fluid, return line means connecting the downstream pump to said reservoir, and means connecting the reservoir to said upstream pump thus forming a closed fluid circuit.

References Cited

UNITED STATES PATENTS

| 691,078 | 1/1902 | Schiller | 60—51 |
| 2,597,050 | 5/1952 | Audemar | 60—51 |
| 3,200,590 | 8/1965 | Summerlin | 60—51 |

EDGAR W. GEOGHEGAN, Primary Examiner